(12) United States Patent
Hoover et al.

(10) Patent No.: US 11,552,901 B2
(45) Date of Patent: Jan. 10, 2023

(54) AUTOMATED DECISION TECHNIQUES FOR CONTROLLING RESOURCE ACCESS

(71) Applicant: EQUIFAX INC., Atlanta, GA (US)

(72) Inventors: Todd Duncan Hoover, Suwanee, GA (US); Brandi Nicole Recker, Atlanta, GA (US); William Charles Gates, Atlanta, GA (US); Sean Patrick McKeown, Atlanta, GA (US); Matthew Richard Jackson, Cumming, GA (US); Dinesh Hiro Wadhwani, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 17/348,470

(22) Filed: Jun. 15, 2021

(65) Prior Publication Data
US 2022/0400087 A1 Dec. 15, 2022

(51) Int. Cl.
*H04L 47/70* (2022.01)
*H04L 47/762* (2022.01)
*H04L 47/74* (2022.01)
*H04L 47/78* (2022.01)

(52) U.S. Cl.
CPC .......... *H04L 47/821* (2013.01); *H04L 47/745* (2013.01); *H04L 47/762* (2013.01); *H04L 47/788* (2013.01); *H04L 47/822* (2013.01); *H04L 47/828* (2013.01)

(58) Field of Classification Search
CPC ... H04L 47/821; H04L 47/745; H04L 47/762; H04L 47/788; H04L 47/822; H04L 47/828
See application file for complete search history.

(56) References Cited

U.S. PATENT DOCUMENTS

| 11,356,384 B1 * | 6/2022 | Desai ................... H04L 47/781 |
| 2018/0063025 A1 * | 3/2018 | Nambiar ............... H04L 47/822 |

* cited by examiner

*Primary Examiner* — Jung H Park
(74) *Attorney, Agent, or Firm* — Kilpatrick Townsend & Stockton LLP (57) ABSTRACT

A durability assessment system may receive a request, from a computing system, for a durability index describing an entity. The durability assessment system may determine the durability index based on information about the resource usage by the entity, such as a resource availability score or a resource allocation score. The durability assessment system may compare the obtained resource availability score and resource allocation score to ranges associated with a set of durability indices. Based on the comparison, the durability assessment system may determine a durability index for the entity. The durability index may indicate an ability of the entity to return accessed resources. In some cases, the durability assessment system may provide the durability index to an allocation computing system that is configured to determine whether to grant access to resources based on the durability index.

20 Claims, 6 Drawing Sheets

AUTOMATED DECISION TECHNIQUES FOR CONTROLLING RESOURCE ACCESS

TECHNICAL FIELD

This disclosure relates generally to the field of access control, and more specifically relates to decision techniques to control access to resources.

BACKGROUND

Resource access control becomes more and more challenging as various resources, such as computing resources, storage resources, network resources, interactive computing environment, or other types of resources, can be more conveniently acquired and accessed. For example, a user can acquire an online storage resource through online transactions with a resource provider of the online storage resource, and access the online storage resource over the Internet. Similarly, a consumer can obtain the resource or a token representing the resource through an online request and gain access to an online interactive computing environment associated with the resource.

As resources are limited and are generally shared by multiple resource users or entities, access control is typically performed to prevent intentional or unintentional resource access or overuse. For example, malicious users may try to withhold the resource to take advantage of a resource provider system or to attack the resource provider system to prevent the resource provider system from functioning normally. But, conventional resource provider systems may lack the capability to or be unable to determine, with accuracy, whether a requesting entity is a legitimate entity, which can reliably return or release the accessed resources. Thus, the conventional resource provider systems may inappropriately grant resource access to a remote computing system or its associated entity.

SUMMARY

According to certain embodiments, a durability assessment model is generated. Generating the durability assessment model includes ranking a plurality of entities according to a respective resource availability score of each of the entities. For each entity, the respective resource availability score measures an amount of resources associated with the entity. Generating the durability assessment model also includes ranking the plurality of entities according to a respective resource allocation score of each of the entities. For each entity, the respective resource allocation score measures an allocation of available resources associated with the entity. Generating the durability assessment model also includes, for each entity, calculating a combination score by combining the ranking of the resource availability score and the ranking of the resource allocation score. Generating the durability assessment model also includes determining a set of durability indices. Determining the set of durability indices includes dividing the combination scores into ranges, where each range is associated with a durability index. Determining the set of durability indices also includes determining, for each durability index, a resource availability range for the respective resource availability score and a resource allocation range for the respective resource allocation score. The durability assessment model is accessed. For an additional entity, a particular resource availability score and a particular resource allocation score are obtained. The particular resource availability score and the particular resource allocation score are compared with the resource availability ranges and the resource allocation ranges associated with the set of durability indices. Based on the durability assessment model, a durability index is determined for the additional entity. Determining the durability index is based on the particular resource availability score falling into a respective resource availability range that is associated with the durability index for the additional entity. In addition, determining the durability index is based on the particular resource allocation score falling into a respective resource allocation range that is associated with the durability index for the additional entity. The durability index is transmitted to an allocation computing system for use in controlling access of the additional entity to one or more interactive computing environments.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Certain embodiments described herein involve generating a durability assessment model that can identify a durability index for an entity or a computing system, such as a computing system that is requesting access to a resource. An allocation computing system that controls the resource may provide to the durability assessment model information about the requesting entity or its associated computing system. In addition, based on a durability index provided by the durability assessment model, the allocation computing system may determine whether to grant the requesting entity or computing system access to the controlled resource. By using some examples, an allocation computing system can more accurately determine whether a requesting entity or a computing system is likely to reliably return a portion of accessed resources.

The following examples are provided to introduce certain embodiments of the present disclosure. In some cases, an allocation computing system may perform decisions about allocation of resources that are represented by the allocation computing system. The allocation computing system may represent or manage computing resources, such as processor capacity, network bandwidth, data storage, or other computing resources. In some cases, the allocation computing system may represent or manage a resource that includes an interactive computing environment, such as an interactive online environment in which an entity can interact, via its associated computing system, with one or more additional computing systems, such as the allocation computing system. The interactive computing environment may include a user interface. An entity can interact with the user interface to receive information about additional resources accessed by the entity, such as information about usage of network storage, consumption of electrical power, allocated capital, or other additional resources. In some cases, the allocation computing system may represent or manage non-computing resources, such as capacity of manufacturing equipment, transportation capacity, scheduling of trained personnel, financial resources, or other non-computing resources.

In this example, the allocation computing system may receive requests from multiple remote computing systems to access the resources represented by the allocation computing system.

If requests for resources exceed the available represented resources, the allocation computing system may attempt to grant or deny access to a particular one of the requesting entities or computing systems based on how reliably the particular remote computing system can return a portion of accessed resources. For example, the allocation computing system may attempt to implement access decisions for requesting systems that can utilize the accessed resources and timely return them. Returning resources may include releasing control of the resource, providing a replacement resource, ceasing use of a resource, or other suitable techniques to return an accessed resource. An example of releasing control of a resource can include releasing a telecommunication channel that is reserved for use. An example of providing a replacement resource can include repayment of a financial resource. An example of ceasing use of a resource can include logging out of an interactive computing environment.

In some cases, the allocation computing system may improve efficient usage of the represented resources, by prioritizing access by requesting computing systems that can reliably return the resources by, for example, quickly freeing resources for use by additional requesting entities or computing systems.

To determine whether to grant access of the requesting entity or computing system to the resources, the allocation computing system may request from a durability assessment system a durability index that describes the requesting computing system. The durability assessment system may determine the durability index for the requesting computing system based on information about the resource usage by the requesting entity or computing system. For example, the durability assessment system may obtain one or more of a resource availability score or a resource allocation score for the requesting computing system. In addition, the durability assessment system may compare the obtained resource availability score and resource allocation score to ranges associated with a set of durability indices. Based on the comparison, the durability assessment system may determine a durability index for the requesting computing system. The durability index may indicate an ability of the requesting computing system to return the resources, such as how quickly the requesting system can use and return accessed resources, or a likelihood of whether the requesting system would request access to additional resources without returning previously accessed resources. In some cases, the durability index indicates a relative durability, such as a relative durability of the requesting computing system as compared to additional durabilities of additional computing systems that have requested resources. The durability assessment system may provide the identified durability index to the allocation computing system. In addition, based on the durability index, the allocation computing system may implement a decision about whether to grant the requesting computing system access to a portion of the resources controlled by the allocation computing system.

In some implementations, a durability assessment system may determine a set of durability indices. The set of durability indices may be determined based on information about resource usage by multiple entities or multiple computing systems. For example, a durability assessment system may rank multiple entities or associated computing systems according to a resource availability score, such as a score indicating a quantity of resources available to each entity. In addition, the multiple entities or associated computing systems may be ranked according to a resource allocation score, such as a score indicating a ratio of resources allocated or otherwise utilized by each entity. The durability assessment system may calculate a combination of the rankings for each entity, such as a combination score describing each entity's relative rankings for available resources and allocated resources. The durability assessment system may determine ranges, e.g., durability ranges, which are associated with sub-groups of the combination scores. In addition, the durability assessment system may determine a set of durability indices based on the durability ranges, such as a durability index based on each particular durability range.

Certain aspects described herein, such as techniques to evaluate whether a computing system that requests resources can reliably return the requested resources, provide improvements for durability assessment systems or allocation computing systems. For example, existing allocation systems may fail to account for durability of a requesting computing system when evaluating a request to access to a managed computing resource. By contrast, a durability assessment model as described herein may identify a durability index that provides an improved assessment of a requesting computing system. The durability index may include data that describes the improved assessment, such as by indicating a relation between use of resources by the requesting system and use of resources by additional computing systems. For example, the durability index may indicate whether the requesting system utilizes resources in a similar manner as resource utilization by the additional computing systems. In addition, the durability assessment model may include one or more specialized data structures, such as a set of one or more durability ranges associated with a set of durability indices, that improve an accuracy for identifying the durability index.

In some cases, an allocation computing system may apply a durability index to determine with improved accuracy whether to grant or deny access to a computing resource. In some aspects, a durability assessment system may apply rules of a particular type that improve existing techniques for evaluating a request to access to a managed computing resource. For example, to identify relationships among computing systems that have been granted access to a resource, a particular set of rules may be employed to determine one or more specialized data structures used by a durability assessment model. For instance, a specialized date structure describing durability ranges may be generated based on rules related to calculating and determining ranges for combination scores. The particular set of rules may allow the durability assessment model to identify groups of combination scores or associated ranges more accurately. In addition, the particular rules may enable improved efficiency in applying the durability assessment model to data describing a requesting computing system, such as by facilitating quick and efficient comparison of the data to the specialized data structures included in the durability assessment model.

Figure 1:
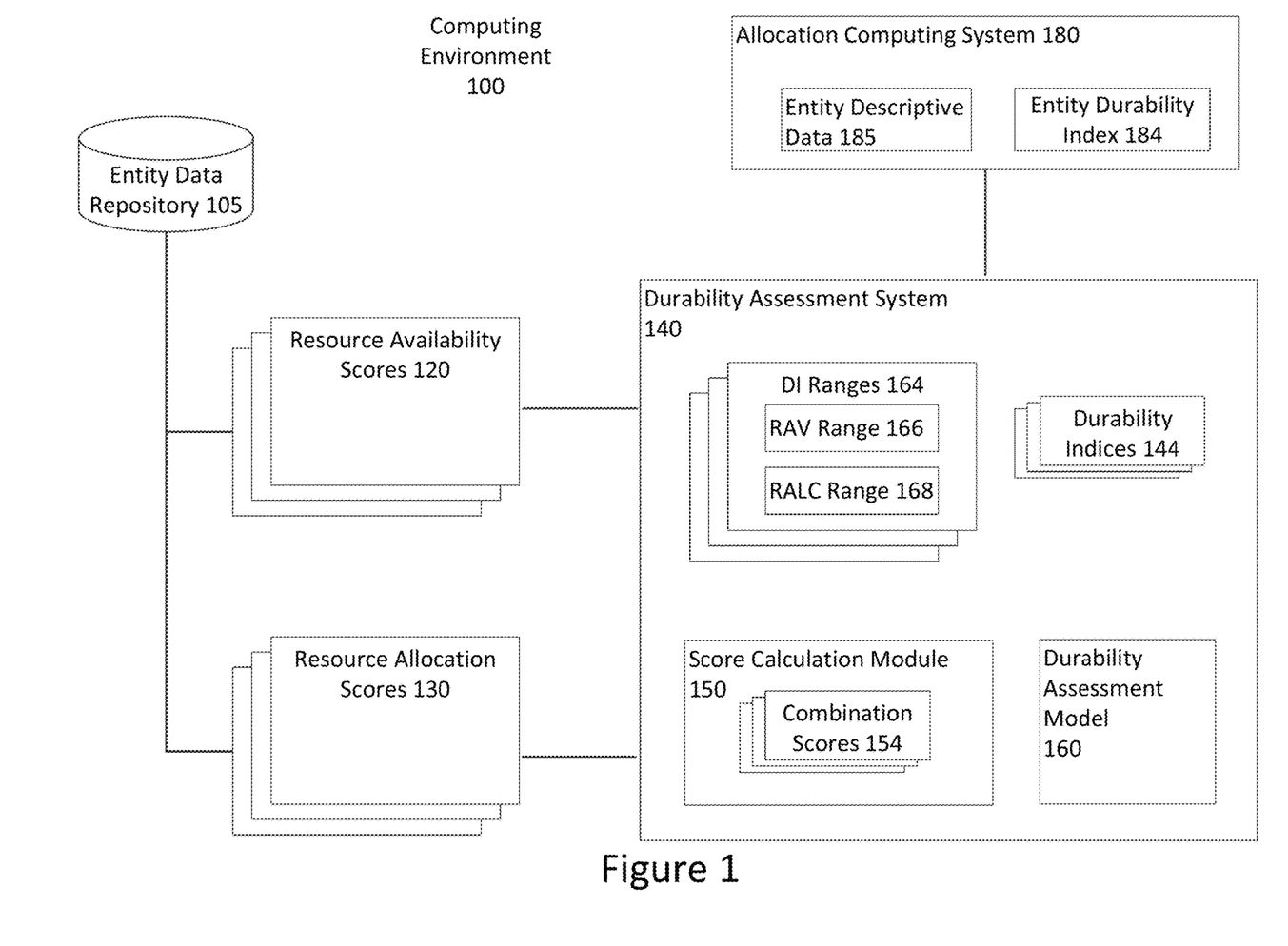
FIG. 1 is a block diagram depicting an example of a computing environment in which a durability assessment system may generate or modify a durability assessment model, according to certain embodiments.

Referring now to the drawings, FIG. 1 is a block diagram depicting an example of a computing environment 100 in which a durability assessment system 140 may generate or modify a durability assessment model 160. Based on the durability assessment model 160, the durability assessment system 140 may generate at least one durability index, such as a set of durability indices 144. Each durability index in the durability indices 144 may indicate an estimation of durability, such as an estimation of how reliably a requesting entity or computing system can return resources that have been accessed by the requesting entity or computing system. For example, if a computing system that is associated with an entity requests resources, such as to address a sudden demand on existing resources of the entity, a durability of the requesting computing system may indicate how reliably the entity or the associated computing system can return the requested resources, such as after addressing the sudden demand. In addition, responsive to identifying a durability of the requesting computing system, an additional computing system (such as an allocation computing system) can provide a data message to the requesting computing system describing one or more resources that are available, e.g., for allocation. In some implementations, the requesting entity or computing system may return resources by releasing control of the resource, providing an additional resource in exchange or as a replacement, ceasing use of a resource, or other suitable techniques to return an accessed resource. An example of releasing control of a resource can include releasing a telecommunication channel that is reserved for use by the entity. An example of providing an additional resource can include payment for a utility or service. An example of ceasing use of a resource can include logging out of an interactive computing environment.

In some embodiments, the durability assessment system 140 may respond to durability requests. For example, an allocation computing system 180 in the computing environment 100 may provide to the durability assessment system 140 entity descriptive data 185. In some cases, the entity descriptive data 185 may describe a computing system that is requesting resources managed or otherwise represented by the allocation computing system 180. In addition, the entity descriptive data 185 may describe an entity that is associated with the requesting computing system. Examples of an entity may include a person, a company, an educational institution, or other suitable types of entities. Based on the entity descriptive data 185, the durability assessment system 140 may identify or calculate a particular one of the durability indices 144, such as an entity durability index 184. In some cases, the particular one of the durability indices 144 may be identified or calculated via the durability assessment model 160. The durability assessment system 140 may provide the entity durability index 184 to the allocation computing system 180. In some cases, the entity durability index 184 may indicate a durability of the computing system that is requesting the resources of the allocation computing system 180. In addition, the entity durability index 184 may indicate a durability of the entity associated with the requesting computing system. For example, the entity durability index 184 may describe a probability (or other numeric representation) that the requesting computing system or entity can return allocated resources within a particular timeframe, whether the requesting computing system or entity can request further resources from the allocation computing system 180, or other potential outcomes that can impact whether the requesting computing system or entity can return allocated resources to the allocation computing system 180. FIG. 1 depicts the entity descriptive data 185 and the entity durability index 184 as being received from and provided to the allocation computing system 180, but other implementations are possible. For example, the durability assessment system 140 may receive entity descriptive data from an additional computing system, such as an additional computing system associated with the durability assessment system 140 or a computing device associated with an additional entity that is requesting resources. In addition, the durability assessment system 140 may provide an entity durability index to an additional computing system, such as the example of the computing device associated with the additional entity.

In some cases, the durability assessment system 140 may generate or modify the durability assessment model 160 based on data describing one or more entities, such as by generating durability index ranges that reflect combinations of resources available to and resources allocated by multiple entities or multiple associated computing systems. In addition, the durability assessment model 160 may be generated or modified based on data received from an entity data repository 105. The entity data repository 105 may include data, such as training data, that describes entities that may request resources. In some cases, the data repository 105 may include data describing usage of resources by the one or more entities. For example, the data repository 105 may describe computing resources that are utilized by one or more computing systems associated with the entities. In addition, the data repository 105 may describe non-computing resources that are managed by computing systems associated with entities, such as a utility computing system configured to manage consumption of a shared utility. Examples of a shared utility can include electrical power, water, or other utilities. Additional types of non-computing resources may include manufacturing resources, financial resources, or any other type of non-computing resource that may be managed by a computing system associated with an entity.

In some cases, the entity data repository 105 may include data, such as a group of resource availability scores 120, describing a respective resource availability score for each entity described in the data repository 105. Examples of resource availability scores include, without limitation, an ability-to-pay ("ATP") score, an income-age bracket, or other suitable types of data that describe resources that are presently available to the particular entity or associated computing system. The group of resource availability scores 120 may include a first resource availability score that is associated with a first entity, a second resource availability score that is associated with a second entity, up through an nth resource availability score that is associated with an nth entity. In some cases, each respective one of the resource availability scores 120 may describe resources that are presently available to the particular entity, such as computing resources included in or allocated to a computing system associated with the particular entity. For example, a particular resource availability score may describe, at least, a network bandwidth that is available to the requesting computing system. In some cases, a particular resource availability score may indicate a total amount of resources available to the respective associated computing system, an amount of resources in a particular category, or any other suitable categorization of available resources.

In addition, the entity data repository 105 may include data, such as a group of resource allocation scores 130, describing a respective resource allocation score for each entity described in the data repository 105. Examples of resource allocation scores include, without limitation, a discretionary spending index ("DSP"), a wealth bracket, or other suitable types of data that describe resources that are presently allocated by the particular entity or associated computing system. The group of resource allocation scores 130 may include a first resource allocation score that is associated with the first entity, a second resource allocation score that is associated with the second entity, up through an nth resource allocation score that is associated with the nth entity. In some cases, each respective one of the resource allocation scores 130 may describe resources that are presently allocated by the particular entity, such as computing resources that are being used by a computing system associated with the particular entity. In addition, each respective one of the resource allocation scores 130 may describe a ratio between resources that are presently being used by the computing system and resources that are presently available to the computing system. For example, a particular resource allocation score may describe, at least, a percentage of available network bandwidth that is being used by the requesting computing system. In some cases, at least one of the resource allocation scores 130 may include (or omit) resources that have been granted to the respective computing system associated with the particular entity, such as resources previously granted by the allocation computing system 180. In some cases, a particular resource allocation score may indicate a total amount of resources utilized by the respective associated computing system, an amount of utilized resources in a particular category, or any other suitable categorization of utilized resources.

In FIG. 1, the resource availability scores 120 and resource allocation scores 130 are described in regards to resources available to or allocated by computing systems associated with respective entities, but other implementations are possible. For example, the entity data repository 105 may include resource availability scores or resource allocation scores that respectively describe resources that are available to or allocated by an entity. As an example, and without limitation, if a particular entity is a manufacturing business, the entity data repository 105 may include a resource availability score and a resource allocation score that describe manufacturing equipment that is available to and utilized by the manufacturing business.

In FIG. 1, the durability assessment system 140 may receive one or more of the resource availability scores 120 or the resource allocation scores 130 from the entity data repository 105. In some cases, the durability assessment system 140 may rank one or more of the resource availability scores 120 or the resource allocation scores 130. For example, the resource availability scores 120 may be ranked based on one or more data values indicating the resources that are presently available to a respective entity associated with a particular one of the resource availability scores 120. Examples of data values may include numeric values, Boolean values, or other suitable types of values. In addition, the resource allocation scores 130 may be ranked based on one or more data values indicating resources that are presently allocated by the respective entity associated with a particular one of the resource allocation scores 130.

In some embodiments, a score calculation module 150 that is included in the durability assessment system 140 may calculate one or more combination scores 154 on the resource availability scores 120 and resource allocation scores 130. In some cases, the score calculation module 150 may generate a particular combination score for each entity associated with the scores 120 and 130. For example, the score calculation module 150 may calculate a first combination score that is associated with the first entity, based on a combination of the first resource availability score and the first resource allocation score that are associated with the first entity. In addition, score calculation module 150 may calculate a second combination score that is associated with the second entity, based on a combination of the second resource availability score and the second resource allocation score that are associated with the second entity. In some cases, the score calculation module 150 may generate a combination score for a particular entity based on an average of the rankings of the resource availability score and resource allocation score for the particular entity, a weighted average of the rankings, or any other suitable combination technique. FIG. 1 depicts the durability assessment system 140 as receiving the scores 120 and 130 from the entity data repository 105, but other implementations are possible. For example, a durability assessment system may generate one or more resource availability scores or resource allocation scores, such as via a score calculation module configured to calculate resource availability or allocation scores based on data describing entities or computing systems associated with entities. In some cases, a score calculation module may be configured to rank one or more of a group of resource availability scores or a group of resource allocation scores.

In FIG. 1, the durability assessment system 140 may determine one or more ranges associated with the combination scores 154. For example, the durability assessment model 160 may identify a group of the combination scores 154 that are associated with a particular group of the resource availability scores 120 and a particular group of the resource allocation scores 130. In some cases, the durability assessment model 160 may generate a set of durability index ranges 164 based on the identified ranges of the combination scores 154. For example, a first one of the durability index ranges 164 may include a resource availability range 166 and a resource allocation range 168. The resource availability range 166 may describe a range of values, such as a numeric range, of the particular group of the resource availability scores 120 associated with the identified group of the combination scores 154. The resource allocation range 168 may describe a range of values of the particular group of the resource allocation scores 130 associated with the identified group of the combination scores 154. In some embodiments, the durability assessment model 160 may identify the durability indices 144 based on the durability index ranges 164. Each of the durability indices 144, for example, may be associated with a particular one of the durability index ranges 164. In addition, one of the durability index ranges 164 may include one or more pairs of resource allocation and resource availability ranges, such as a pair that includes a particular resource allocation range and a particular resource availability range included in the particular durability index range.

In some embodiments, a computing system may control access to one or more resources, such as computing resources, based on information received from a durability assessment system. For example, an allocation computing system can receive a durability index from a durability assessment system. The durability index can be associated with a computing system that has requested access to one or more computing resources managed or otherwise controlled by the allocation computing system. In addition, the allocation computing system may determine whether to grant the requesting computer system access to the computing resources based on the durability index. For example, the allocation computing system may compare the durability index to one or more thresholds, and grant (or deny) access responsive to determining that the durability index is above (or below) a particular threshold.

Figure 2:
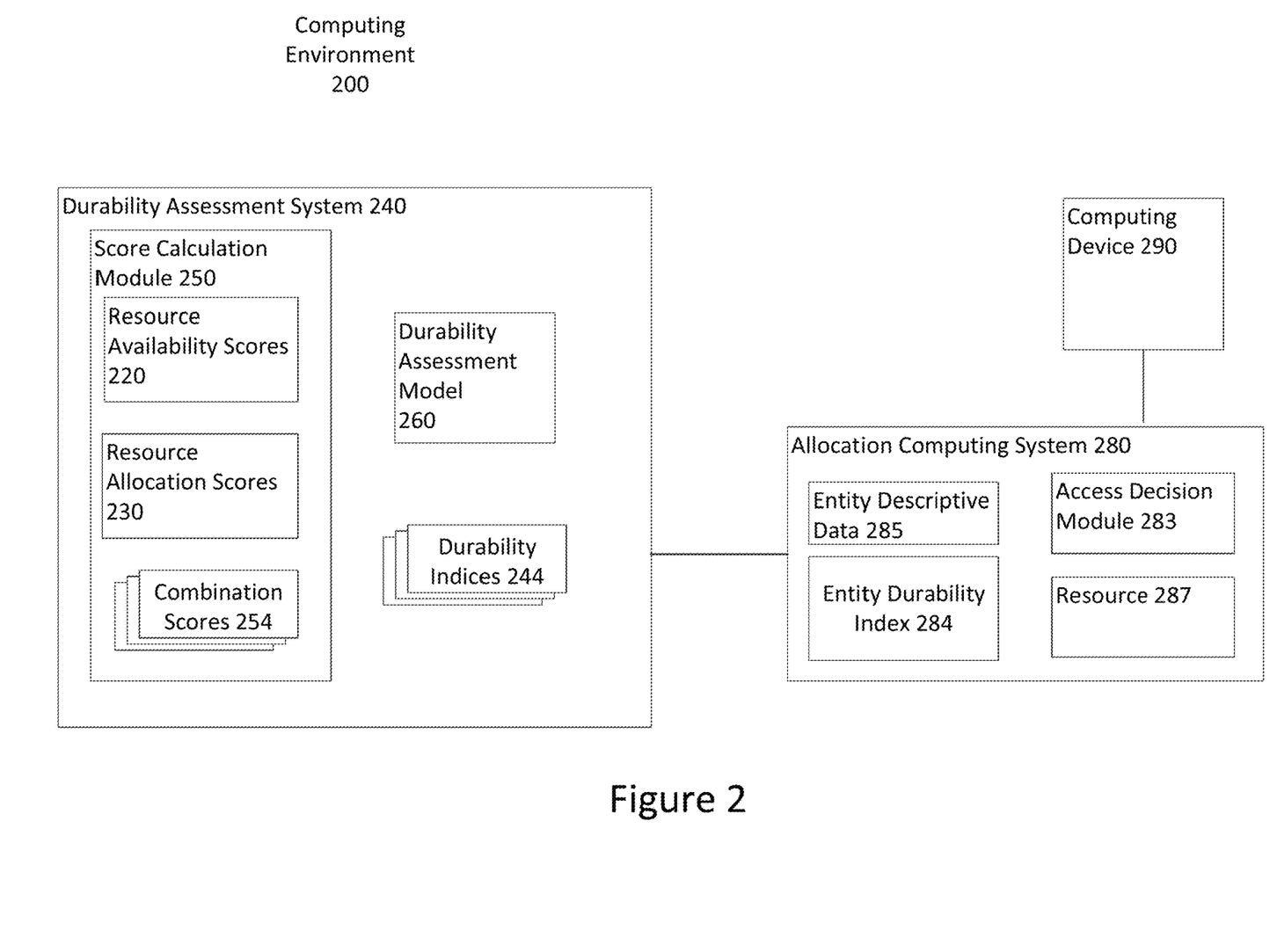
FIG. 2 is a block diagram depicting an example of a computing environment in which an allocation computing system may be configured to control access to one or more resources based on information received from a durability assessment system, according to certain embodiments.

FIG. 2 includes a block diagram depicting an example of a computing environment 200 that may include one or more of a durability assessment system 240, an allocation computing system 280, or a computing device 290. The computing system device 290 may be associated with an entity. In the computing environment 200, the allocation computing system 280 may be configured to control access to one or more computing resources, such as a resource 287, based on information received from the durability assessment system 240. In some implementations, the resource 287 may include one or more resources associated with (or otherwise provided via) an interactive computing environment, such as an online environment with which the computing device 290, or an entity using the device 290, can interact with to view, manage, or otherwise access the resources. FIG. 2 depicts the allocation computing system 280 as controlling access to one or more resources, such as processor capacity, network bandwidth, data storage, manufacturing resources, financial resources, or any other resource that may be represented or managed by an allocation computing system.

In some embodiments, the durability assessment system 240 may include a durability assessment model 260. The durability assessment system 240 may generate a set of durability indices 244 using the durability assessment model 260. In some cases, the durability assessment system 240 may generate or modify the durability assessment model 260 based on resource availability scores or resource allocation scores associated with one or more entities. For example, the durability assessment system 240 may include a score calculation module 250 that is configured to generate resource availability scores 220, resource allocation scores 230, or combination scores 254, based on data describing one or more entities. In addition, the durability assessment model 260 may generate the durability indices 244 based on ranges, such as durability index ranges that are identified based on ranges of the scores 220, 230, or 254. In some cases, ranges of the scores 220, 230, or 254 may be identified based on ranked scores, such as a ranking of one or more of the resource availability scores 220 or the resource allocation scores 230.

In FIG. 2, the allocation computing system 280 may receive a request from the computing device 290. An example of such a request is a request to access the resource 287 by the computing device 290. The allocation computing system 280 may receive entity descriptive data 285 responsive to receiving the request to access the resource 287. The entity descriptive data 285 may indicate one or more of a resource availability score or a resource allocation score that are associated with the computing device 290 or with an entity that is associated with the computing device 290. In addition, the entity descriptive data 285 may indicate information about resource usage by the computing device 290 or the associated entity, such as non-score information describing available or allocated resources. In some cases, the computing device 290 may provide some or all of the entity descriptive data 285 to the allocation computing system 280. In addition, the allocation computing system 280 may request some or all of the entity descriptive data 285 from an additional computing system, such as a data repository that describes resources associated with the computing device 290 or additional computing systems associated with one or more additional entities. In some cases, the score calculation module 250 may calculate one or more of a resource availability score or a resource allocation score for the computing device 290, based on the entity descriptive data 285.

In some embodiments, the allocation computing system 280 may request, from the durability assessment system 240, assessment data related to the computing device 290 or the associated entity. Responsive to receiving the request to access the resource 287, for example, the allocation computing system 280 may request a durability index associated with the computing device 290 or the associated entity, such as an entity durability index 284. In some cases, the entity durability index 284 is identified based on the entity descriptive data 285. For example, the durability assessment system 240 may receive the entity descriptive data 285 from the allocation computing system 280. In addition, some or all of the entity descriptive data 285 may be provided as input to the durability assessment model 260. Based on the input data, the durability assessment model 260 may output assessment data identifying a durability index for the computing device 290. For example, the output from the model 260 may identify a particular one of the durability indices 244. The durability assessment system 240 may provide the assessment data or the identified durability index, such as the entity durability index 284, to the allocation computing system 280.

In some embodiments, the allocation computing system 280 may determine, based on the entity durability index 284, whether to allow the computing device 290 or the associated entity to access the resource 287. For example, the allocation computing system 280 may grant access to the resource 287 responsive to determining that the entity durability index 284 indicates a high durability, e.g., the computing device 290 or the associated entity can reliably return the resource 287. In addition, the allocation computing system 280 may deny access to the resource 287 responsive to determining that the entity durability index 284 indicates a low durability, e.g., the device 290 or the associated entity is unlikely to return the resource 287 within a particular timeframe. In some cases, the allocation computing system 280 may determine whether to grant access, or determine a level of access, based on a comparison of the entity durability index 284 with one or more thresholds. For example, responsive to determining that the entity durability index 284 exceeds a first threshold, the allocation computing system 280 may grant the computing device 290 with access to a first portion of the resource 287. In addition, responsive to determining that the entity durability index 284 exceeds a second threshold, the allocation computing system 280 may grant the computing device 290 with access to a second portion of the resource 287. For example, if the allocation computing system 280 determines that the entity durability index 284 exceeds the second threshold and also the first threshold, the allocation computing system 280 may grant access to the second portion that includes more of the resource 287 than the first portion.

As an example of durability, if the entity associated with the computing device 290 is a manufacturing facility, the manufacturing facility may be operating at a certain manufacturing capacity, e.g., utilization of production equipment included in the facility. The manufacturing facility may have high durability if, for example, a relatively high proportion of the production equipment is available. In addition, the manufacturing facility may have high durability if, for example, the production equipment is allocated for relatively small projects, such as projects with a short timeframe or that are simple to produce. In this example, the entity durability index 284 may indicate that the manufacturing facility has high durability, e.g., production equipment is available or being allocated for small projects.

Continuing with this example, the manufacturing facility may request access to a portion of the resource 287, such as a computer-aided design program or computer-aided tooling equipment, to perform a particular production task. In addition, the allocation computing system 280 may determine, based on the index 284 associated with the manufacturing facility, whether the manufacturing facility can reliably complete the requested access and return the resource 287, which can free the resource 287 for additional requests from additional manufacturing facilities. If the computing device 290 is granted access to the resource 287, the allocation computing system 280 may provide to the device 290 data describing the granted access, such as data indicating a timeframe associated with the access, authentication information for the resource 287, or other suitable data associated with using the resource 287. If the computing device 290 is denied access to the resource 287, the allocation computing system 280 may provide to the device 290 data describing the denial, such as data indicating a reason why access was denied. For example, the data describing the denial might include a reason code indicating that durability is too low. In this example, the durability assessment model 260 may be trained or generated using combination scores obtained for multiple manufacturing facilities.

As an additional example of durability, if the entity associated with the computing device 290 is an individual, the individual may have resources that include a certain amount of financial capital, e.g. income or savings compared to expenditures. The individual may have high durability if, for example, an available amount of savings is relatively large. In addition, the individual may have high durability if, for example, his or her income is allocated for relatively few expenditures. In this example, the entity durability index 284 may indicate that the individual has high durability, e.g., financial resources are available or being allocated for few expenditures. Continuing with this additional example, the individual may request access to an additional portion of the resource 287, such as telecommunication utility. The durability assessment system 240 may calculate a resource availability score and a resource allocation score for the individual, such as an ATP score and a DSI. The durability assessment system 240 may compare the resource availability score and the resource allocation score with the resource availability score ranges and the resource allocation score ranges associated with each durability index, respectively. For instance, the durability assessment system 240 can determine that the individual's resource availability score and resource allocation score both fall within, respectively, a resource availability score range and a resource allocation score range that are associated with a particular durability index. Based on both scores falling within the respective ranges, the durability assessment system 240 can determine that the entity durability index 284 for this individual is the particular durability index. In addition, the allocation computing system 280 may determine, based on the index 284 associated with the individual, whether the individual can reliably return the resource 287, such as providing payment for the use of the telecommunication utility. In this example, the durability assessment model 260 may be trained or generated using combination scores obtained for multiple individuals. If the entity requesting access to resources is an organization or another type of entity, a durability assessment model used to generate the durability index may be trained using data for that type of entity.

In some embodiments, a durability assessment system may calculate, or otherwise receive, a combination score for each entity in a group of entities. The combination score for each particular entity may be based on a ranking of a respective resource availability score and a ranking of a respective resource allocation score for the particular entity. In addition, the durability assessment system may identify durability indices that are associated with respective groups of combination scores. For instance, a first durability index may be based on a first set of durability index ranges that include multiple combination scores, and a second durability index may be based on a second set of durability index ranges that include multiple additional combination scores.

Figure 3:
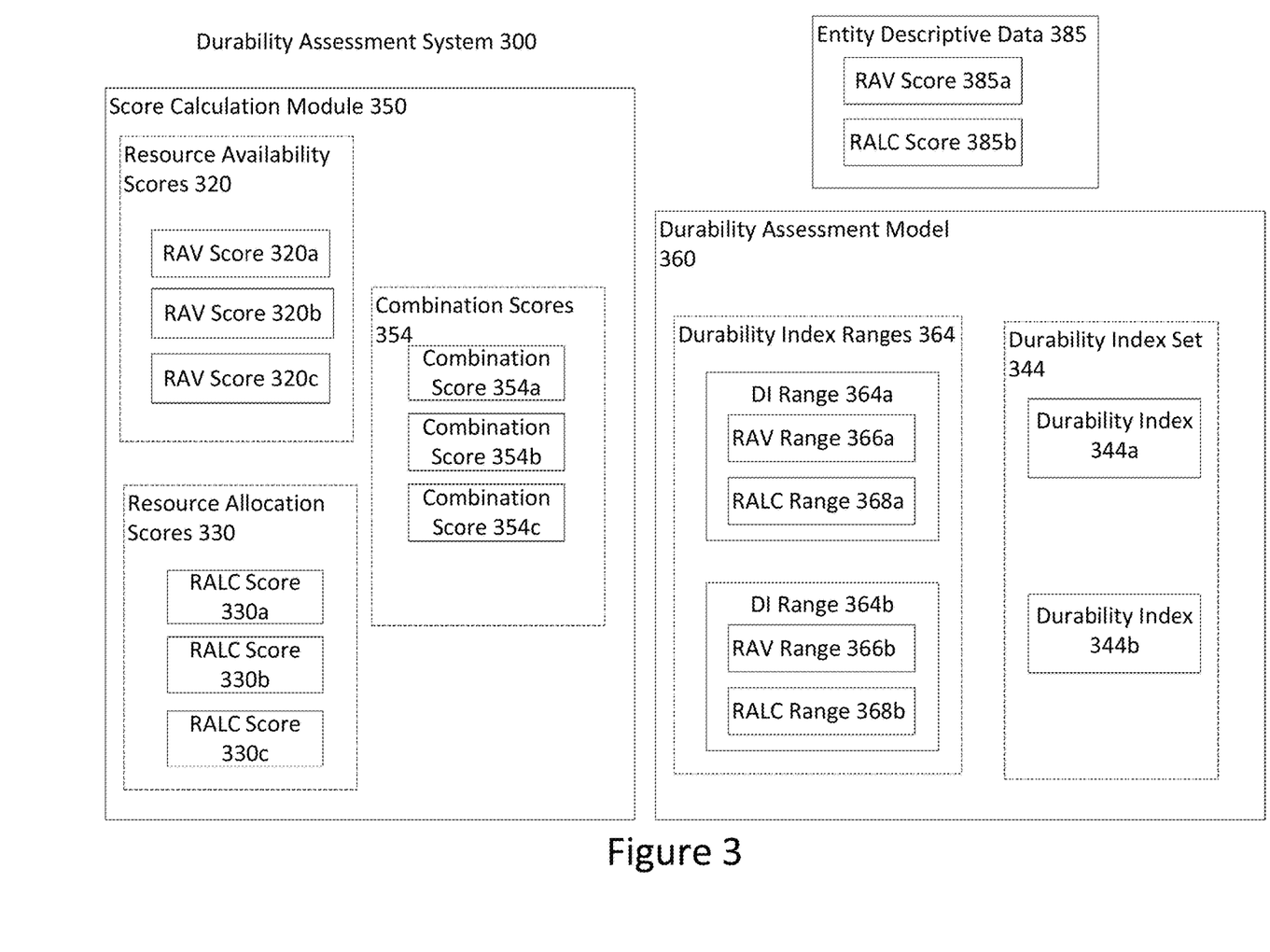
FIG. 3 is a block diagram depicting an example of a durability assessment system configured to generate one or more durability indices based on ranges associated with scores for entities, according to certain embodiments.

FIG. 3 is a block diagram depicting an example of a durability assessment system 300 that may be configured to generate one or more durability indices based on ranges associated with scores for entities, such as resource availability, resource allocation, or combination scores. In the durability assessment system 300, a score calculation module 350 may receive or calculate a group of resource availability scores 320 and a group of resource allocation scores 330 that are respectively associated with a group of entities (e.g., such as described in regards to FIG. 1). For example, the resource availability scores 320 may include a resource availability score 320*a* that is associated with a first entity, a resource availability score 320*b* that is associated with a second entity, and a resource availability score 320*c* that is associated with a third entity. In addition, the resource allocation scores 330 may include a resource allocation score 330*a* that is associated with the first entity, a resource allocation score 330*b* that is associated with the second entity, and a resource allocation score 330*c* that is associated with the third entity. In some embodiments, one or more of the scores 320 or 330 may be ranked. For example, the resource availability scores 320 may be ranked, e.g., highest to lowest, according to a quantity of available resources described by the scores 320. In addition, the resource allocation scores 330 may be ranked, e.g., highest to lowest, according to a ratio of allocated resources described by the scores 330. In some cases, a particular entity may have various rankings for associated resource availability and resource allocation scores. For the example first entity described above, the resource availability score 320*a* may have a highest ranking with respect to the resource availability scores 320*b* and 320*c*, and the resource allocation score 330*a* may have a lowest ranking with respect to the resource allocation scores 330*b* and 330*c*.

In some cases, the score calculation module 350 may generate a group of combination scores 354 that includes a combination score for each particular entity, based on the rankings of the resource availability score and resource allocation score that are associated with the particular entity. For example, the combination scores 354 may include a combination score 354*a* that is associated with the first entity, a combination score 354*b* that is associated with a second entity, and a combination score 354*c* that is associated with a third entity. The combination score 354*a* may be based on a combination of a ranking of the resource availability score 320*a* and a ranking of the resource allocation score 330*a*. The combination score 354*b* can be based on a combination of a ranking of the resource availability score 320*b* and a ranking of the resource allocation score 330*b*. The combination score 354*c* can be based on a combination of a ranking of the resource availability score 320*c* and a ranking of the resource allocation score 330*c*. Continuing with the example first entity, the combination score 354*a* may be a combination of the ranking of the resource availability score 320*a* and the ranking of the resource allocation score 330*a*. For illustration and without limitation, if the ranking of the score 320*a* has an associated value of 0.9 (e.g., a 90$^{th}$ percentile) and the ranking of the score 330*a* has an associated value of 0.5 (e.g., a 50$^{th}$ percentile), a value of the combination score 354*a* may be 0.7 (e.g., an average of 0.9 and 0.5).

In some embodiments, the durability assessment system 300 may determine one or more ranges associated with the combination score 354. For example, the durability assessment system 300 may include a durability assessment model 360 trained to identify one or more ranges associated with a set of the combination scores 354. In some cases, the durability assessment model 360 may include a decision tree that is trained to identify one or more of a range of resource availability scores or a range of resource allocation scores that are represented by the combination scores 354. Examples of decision trees may include a binary decision tree, a random forest model, or other types of decision models. The durability assessment model 360 may receive the combination scores 354 as an input. In addition, the durability assessment model 360 may generate a group of durability index ranges 364, such as an output that includes or describes the ranges 364. Each particular range in the durability index ranges 364 may include at least one resource availability range based on resource availability scores in a group of one or more of the combination scores 354 that are associated with the particular range. In addition, each particular range in the durability index ranges 364 may include at least one resource allocation range based on resource allocation scores in the group of the combination scores 354 that are associated with the particular range.

For example, the durability index ranges 364 may include a first durability index range 364*a* and a second durability index range 364*b*. The durability index range 364*a* may be associated with a first group of combination scores including the scores 354*a* and 354*b*. In some cases, the first durability index range 364*a* may include a resource availability range 366*a* that represents a range of the resource availability scores associated with the first group of combination scores, e.g., the resource availability scores 320*a* and 320*b*. In addition, the durability index range 364*a* may include a resource allocation range 368*a* that represents a range of the resource allocation scores associated with the first group of combination scores, e.g., the resource allocation scores 330*a* and 330*b*. In addition, the durability index range 364*b* may be associated with a second group of combination scores including the score 354*c*. For illustration and without limitation, if the resource availability scores 320*a* and 320*b* have respective values of 950 and 800 in an example set of possible values of 0 to 1000, the resource availability range 366*a* may have a range of values of about 800-950. As a further illustrative example, if the resource allocation scores 330*a* and 330*b* have respective values of 850 and 600 in the example set of possible values of 0 to 1000, the resource allocation range 368*a* may have a range of values of about 600-850.

In some cases, the second durability index range 364*b* may include a resource availability range 366*b* that represents a range of the resource availability scores associated with the second group of combination scores, e.g., the resource availability score 320*c*. In addition, the durability index range 364*b* may include a resource allocation range 368*b* that represents a range of the resource allocation scores associated with the second group of combination scores, e.g., the resource allocation score 330*c*. In some cases, the durability assessment model 360 may determine ranges that respectively include the scores 320*c* and 330*c*. For illustration and without limitation, if the resource availability score 320*c* has a value of 600 and the resource allocation score 330*c* has a value of 550, among the example set from 0 to 1000, the durability assessment model 360 may calculate a range of 580-620 for the resource availability range 366*b* and a range of 530-570 for the resource allocation range 368*b*. In this example, the calculated range is the values 600 and 550, plus or minus 20.

FIG. 3 depicts the durability index ranges 364*a* and 364*b* as each including a respective resource availability range and a respective resource allocation range, but other implementations are possible. For example, an additional durability index range may include multiple sets of resource availability and resource allocation ranges, such as a durability index range that is associated with multiple sub-groups of combination scores. In addition, the durability assessment system 300 is described as having resource availability and allocation scores in an example of a set of possible values from 0 to 1000, but other implementations are possible. For example, resource availability and allocation scores can alternatively be expressed as percentiles, normalized, calculated based on an additional set of possible values, or involve other techniques to determine values for resource availability or allocation scores.

For convenience, and not by way of limitation, FIG. 3 is described as having the first durability index range 364*a* corresponding to a group of two combination scores and the second durability index range 364*b* corresponding to a group of one combination score, but other implementations are possible. For example, a durability assessment model may calculate additional durability index ranges corresponding to multiple groups of one, two, or more combination scores, using techniques as described above.

The durability assessment system 300 may generate one or more durability indices, such as a durability index set 344. The durability index set 344 may include a first durability index 344*a* and a second durability index 344*b*. In some cases, each durability index in the set 344 may correspond to a particular one of the durability index ranges 364. For example, the durability index 344*a* may correspond to the durability index range 364*a*, such as the resource availability range 366*a* with values of about 800-950 and the resource allocation range 368*a* with values of about 600-850. In addition, the durability index 344*b* may correspond to the durability index range 364*b*, such as the resource availability range 366*b* with values of about 580-620 and the resource allocation range 368*b* with values of about 530-570.

In some embodiments, the durability assessment system 300 may determine a particular durability index in the set 344 that corresponds to data describing an entity, such as entity descriptive data 385. The durability assessment system 300 may determine the corresponding durability index by comparing the entity descriptive data 385 to one or more ranges in the durability index ranges 364. For example, a resource availability score 385*a* included in or calculated from the entity descriptive data 385 may fall within the resource availability range 366a. In addition, a resource allocation score 385b included in or calculated from the entity descriptive data 385 may fall within the resource allocation range 368a. Responsive to determining that the resource availability score 385a and the resource allocation score 385b respectively fall within the ranges 366a and 368a, the durability assessment system 300 may identify that the durability index 344a corresponds to the entity descriptive data 385, e.g., based on the comparison of the data 385 to the durability index range 364a. In some cases, the durability assessment system 300 may identify a durability index from the set 344 responsive to determining that each of a received resource availability score and a received resource allocation score correspond to a particular one of the durability index ranges 364. An example of correspondence between a score and a durability index range can include a score that falls within a range. In addition, the durability assessment system 300 may identify a durability index from the set 344 responsive to determining that at least one of a received resource availability score and a received resource allocation score correspond to a particular one of the durability index ranges 364. In some cases, the durability assessment system 300 may identify a potential match between received entity descriptive data and a particular one of the durability index ranges 364. For example, the durability assessment system 300 may determine that a received resource availability score for a particular entity is within the resource availability range 366a and a resource allocation score for the particular entity is within the resource allocation range 368b. In this example, the durability assessment system 300 may apply the model 360 to determine which of the durability index ranges 364 most closely matches the received scores for the particular entity.

In some cases, the durability assessment system 300 may provide the durability index 344a to an additional computing system. For example, the durability assessment system 300 may provide the durability index 344a to an allocation computing system configured to determine, using the durability index 344a, whether to grant the described entity access to a computing resource.

Figure 4:
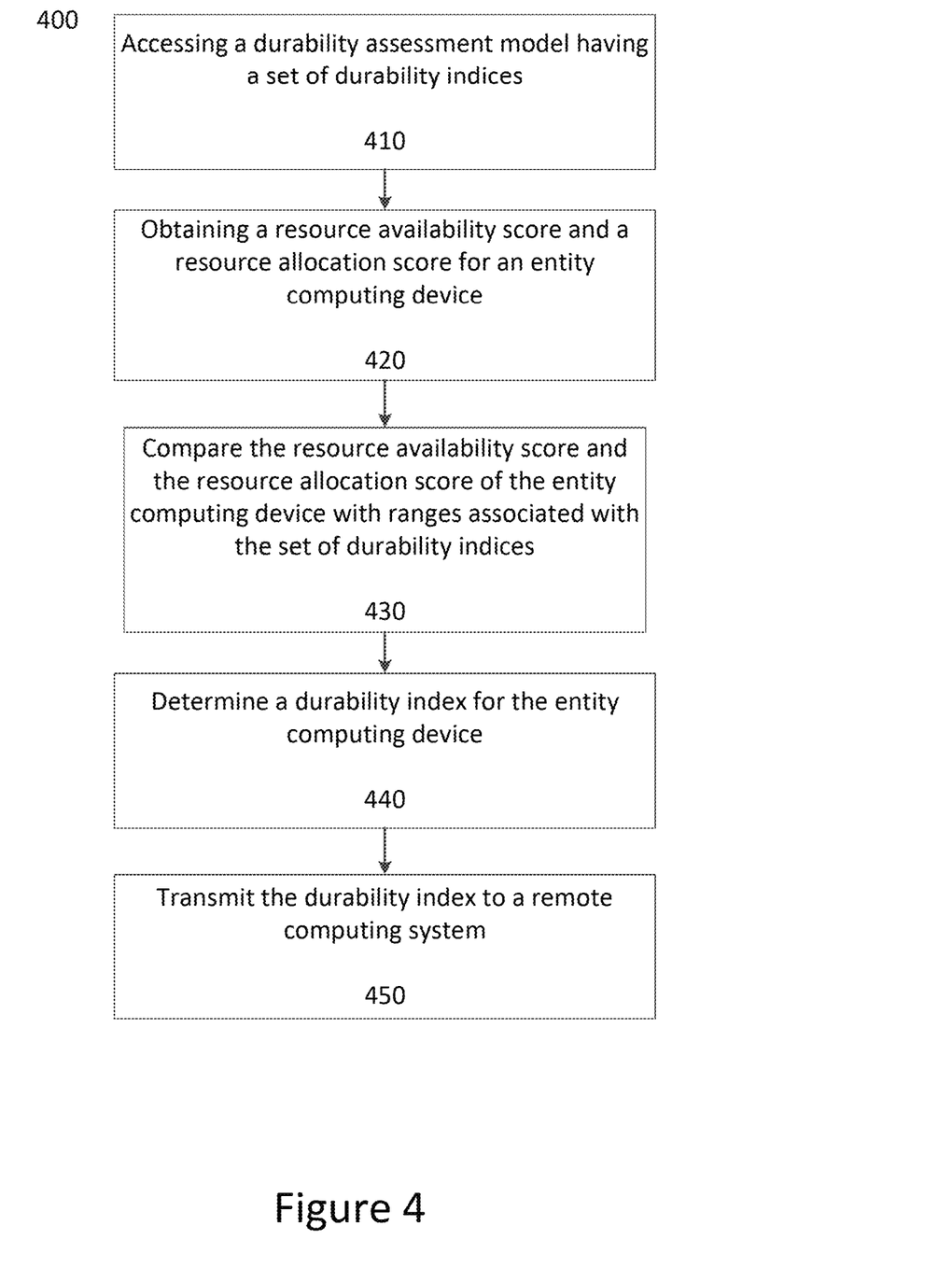
FIG. 4 is a flow chart depicting an example of a process for controlling access to a resource based on a determined durability index, according to certain embodiments.

FIG. 4 is a flowchart depicting an example of a process 400 for determining a durability index, such as to control access to a resource based on the durability index. In some embodiments, such as described in regards to FIGS. 1-3, a computing device executing a durability assessment system (such as one or more of the systems 140, 240, or 300) implements operations described in FIG. 4, by executing suitable program code. For illustrative purposes, the process depicted in FIG. 4 is described with reference to the examples described in FIGS. 1-3. Other configurations, however, are possible.

At block 410, the process 400 may involve accessing a durability assessment model. For example, a durability assessment system implementing some or all of the process 400 may include or otherwise access a trained durability assessment model. The durability assessment model may have one or more durability indices, such as a durability index set that is included in or otherwise associated with the durability assessment model. For example, the assessment model 260 may generate the set of durability indices 244.

At block 420, the process 400 may involve obtaining one or more of a resource availability score or a resource allocation score associated with an entity, or with a computing device associated with the entity, that is requesting access to a resource. In some cases, one or more of the resource availability score or the resource allocation score may be received from an additional computing system, such as an allocation computing system. In addition, one or more of the resource availability score or the resource allocation score may be calculated by a module in the durability assessment system. For example, the durability assessment system 240 may receive the entity descriptive data 285 from the allocation computing system 280. Based on the entity descriptive data 285, the durability assessment system 240 may calculate or otherwise receive a resource allocation score and a resource availability score that describe the computing device 290 or the associated entity.

At block 430, the process 400 may involve comparing one or more of the resource availability score or the resource allocation score with at least one range associated with the durability index set. In some cases, comparing the scores of the computing device for the requesting entity may include determining whether the resource availability score falls within a resource availability range that is associated with a particular durability index in the durability index set. In addition, comparing the scores may include determining whether the resource allocation score falls within a resource allocation range that is associated with a particular durability index in the durability index set. For example, the durability assessment system 300 may compare the entity descriptive data 385 to one or more of the durability index ranges 364. Based on the comparison, the durability assessment system 300 may determine that the resource availability score 385a falls within the resource availability range 366a and that the resource allocation score 385b falls within the resource allocation range 368a. In some cases, comparing a resource availability (or allocation) score to a resource availability (or allocation) range may include calculating whether a value of the score is above a minimum value of the range, below a maximum value of the range, or has another suitable relationship to the range values. In addition, comparing a resource availability (or allocation) score to a resource availability (or allocation) range may include calculating a normalized value of the score, calculating a percentile of the score with respect to the range, or any other suitable technique to determine a relationship between a resource availability (or allocation) score and a resource availability (or allocation) range.

At block 440, the process 400 may involve determining a durability index for the computing device associated with the requesting entity. In some cases, the durability index may be determined based on the comparison of the resource availability score and resource allocation score with the durability index ranges of the set of durability indices. For example, responsive to determining that the scores 385a and 385b respectively fall within the ranges 366a and 368a, the durability assessment system 300 may determine that the entity descriptive data 385 corresponds to the durability index 344a. In addition, the durability assessment system 300 may determine a correlation between the durability index 344a and the computing device (or associated entity) described by the entity descriptive data 385.

At block 450, the process 400 may involve transmitting the durability index to one or more additional computing systems. In some cases, the durability assessment system transmits the durability index to an allocation computing system that is configured to control access of the requesting entity to one or more computing resources. For example, the durability assessment system 240 may provide the entity durability index 284 to the allocation computing system 280. In addition, the allocation computing system 280 may determine, based on the entity durability index 284, whether to grant access by the computing device 290 or the associated entity to the resource 287. In some cases, the durability index is provided to an additional computing system configured to control access to a resource, but other implementations are possible. For example, a durability assessment system may use an identified durability index to determine whether to grant a requesting entity with access to a resource that is controlled by the durability assessment system.

Figure 5:
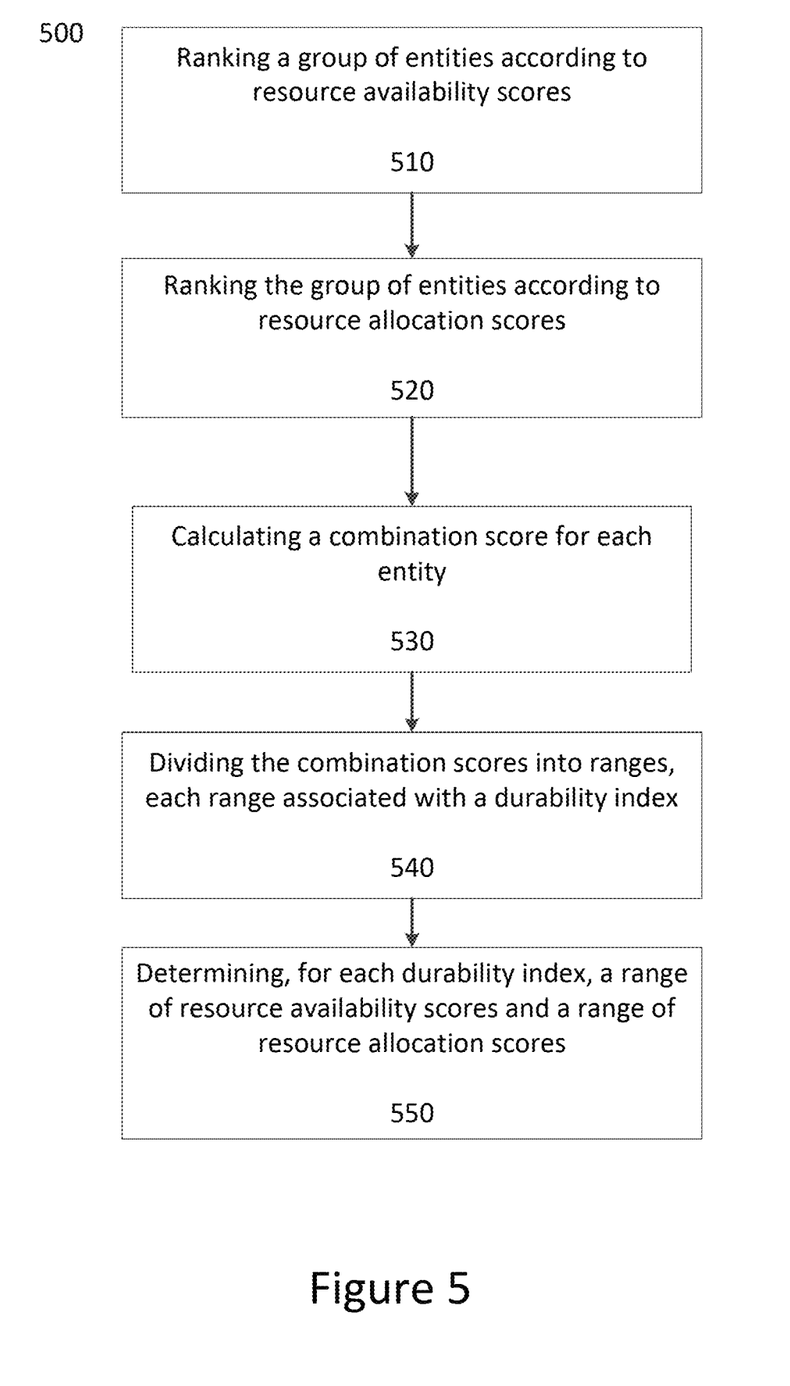
FIG. 5 is a flow chart depicting an example of a process for generating or modifying a durability assessment model, according to certain embodiments.

FIG. 5 is a flowchart depicting an example of a process 500 for generating or modifying a durability assessment model. In some embodiments, such as described in regards to FIGS. 1-4, a computing device executing a durability assessment system implements operations described in FIG. 5, by executing suitable program code. For illustrative purposes, the process depicted in FIG. 5 is described with reference to the examples described in FIGS. 1-4. Other configurations, however, are possible.

At block 510, the process 500 may involve ranking a group of one or more entities, such as entities that are associated with respective systems, based on one or more resource availability scores. For example, each of the entities may be associated with a respective resource availability score. In addition, the entities may be ranked according to relations among the resource availability scores, such as ranking from highest to lowest scores or another suitable relationship among the scores. For example, the durability assessment system 300 may rank the resource availability scores 320 according to a numeric relation among the resource availability scores 320a, 320b, and 320c.

At block 520, the process 500 may involve ranking the group of one or more entities based on one or resource allocation scores. For example, each of the entities may be associated with a respective resource allocation score. In addition, the entities may be ranked according to relations among the resource allocation scores, such as ranking from highest to lowest scores or another suitable relationship. For example, the durability assessment system 300 may rank the resource allocation scores 330 according to a numeric relation among the resource allocation scores 330a, 330b, and 330c.

At block 530, the process 500 may involve calculating a combination score for each entity. For example, each particular entity in the group of entities may be associated with a respective combination score. In addition, the combination score for a particular entity may be based on a combination of the resource allocation score and resource availability score, such as an average or other suitable combination of the rankings of the scores. As a non-limiting example, if a first entity has a resource availability score that has a highest position (e.g., 0.90 or $90^{th}$ percentile) in the ranked resource availability scores and a resource allocation score that has a second-highest position (e.g., 0.80 or $80^{th}$ percentile) in the ranked resource allocation scores, the first entity may have a combination score that indicates an average of the highest position and the second-highest position (e.g., 0.85, an average of 0.80 and 0.90). For example, the durability assessment system 300 may generate the combination scores 354 based on a combination of rankings of the resource availability scores 320 and rankings of the resource allocation scores 330.

At block 540, the process 500 may involve dividing the combination scores into one or more ranges. In some cases, each range may be associated with a group or sub-group of the combination scores. In addition, each range may be associated with a durability index. For example, the durability assessment system 300 may divide the combinations scores 354 into multiple ranges, such as a particular range that includes a particular group or sub-group of the combination scores 354. In addition, the durability assessment system 300 may generate the durability index range 364a based on a first group of combination scores including the combination scores 354a and 354b, and the durability index range 364b based on a second group of combination scores including the combination score 354c. In addition, the durability assessment system 300 may generate the durability index set 344 based on the durability index ranges 364. Continuing with the non-limiting example described in regards to FIG. 3, the durability assessment system 300 may identify that the first group of the combination scores 354a and 354b includes the resource availability scores 320a and 320b with respective values 950 and 800, and the resource allocation scores 330a and 330b with respective values 850 and 600. In addition, the durability assessment system 300 may identify that the second group of the combination score 354c includes the resource availability score 320c with value 600, and the resource allocation score 330c with value 550.

In some examples, dividing the combination scores may be performed to achieve a certain distribution of the durability indices. For instance, the combination scores may be divided into n regions, each of the n regions representing a durability index. The division may be made such that the quantity of entities falling into the n regions follows a certain distribution. For example, the quantity of entities falling into a region corresponding to the highest durability index and the quantity of entities falling into a region corresponding to the lowest durability index may be set to be lower than the quantity of entities falling into a region corresponding to a durability index between the highest and lowest durability index.

At block 550, the process 500 may involve determining one or more ranges of the resource availability scores or the resource allocation scores. In some cases, each durability index is associated with a respective resource availability range and a respective resource allocation range. Determining the ranges of a particular durability index may include determining the respective ranges of resource allocation scores or resource availability scores that are associated with the group of combination scores associated with the particular durability index. For example, the durability assessment system 300 may identify that the resource availability range 366a and the resource allocation range 368a respectively include the ranges of the resource availability scores 320a and 320b, and the resource allocation scores 330a and 330b, based on the inclusion of the scores 320a, 320b, 330a, and 330b in the first group of combination scores 354a and 354b. Continuing with the non-limiting example described in regards to FIG. 3, the durability assessment system 300 may generate the durability index range 364a with the resource availability range 366a of about 800-950 and the resource allocation range 368a of about 600-850. In addition, the durability assessment system 300 may generate the durability index range 364b with the resource availability range 366b of about 580-620 and the resource allocation range 368b of about 530-570.

In some cases, the ranges of the resource availability scores and the resource allocation scores for a particular durability index may be determined based on the combination scores falling into the region corresponding to the particular durability index. Depending on the resource availability scores and the resource allocation scores used to determine the combination scores, there may be multiple ranges of the resource availability scores and the resource allocation scores for a durability index.

In some embodiments, one or more operations in relation to blocks 540 or 550 may be performed via a machine learning model. For example, the durability assessment model 360 may include a decision tree. The decision tree of the model 360 may be trained to identify one or more groups of combination scores within the combination scores 354. In addition, the decision tree of the model 360 may be trained to identify the durability index ranges 364 based on the identified groups of combination scores.

Figure 6:
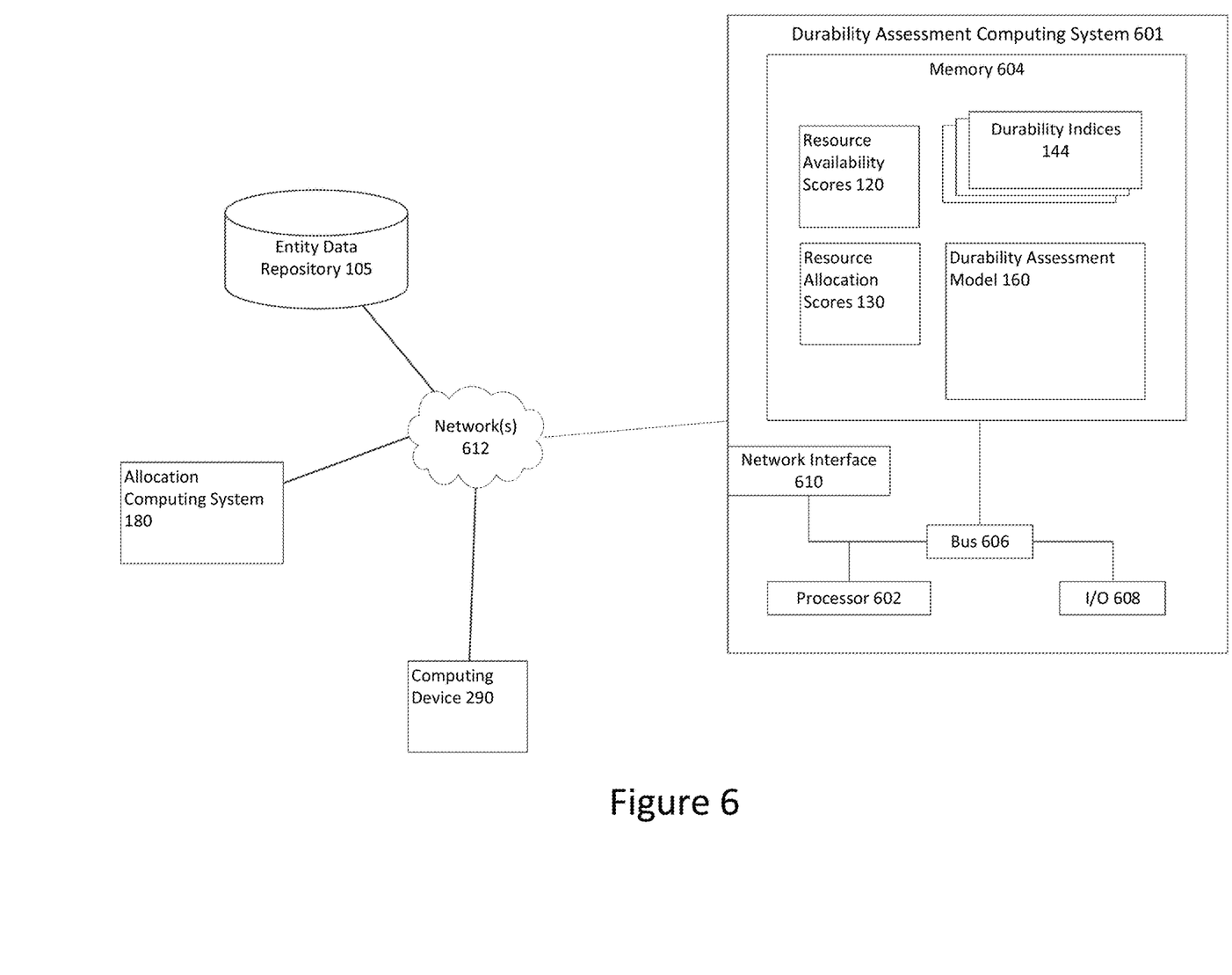
FIG. 6 is a block diagram depicting an example of a computing system for implementing a durability assessment system, according to certain embodiments.

Any suitable computing system or group of computing systems can be used for performing the operations described herein. For example, FIG. 6 is a block diagram depicting a computing system capable of implementing a durability assessment system, according to certain embodiments.

The depicted example of a durability assessment computing system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the resource availability scores 120, the resource allocation scores 130, the durability indices 144, the durability assessment model 160, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The durability assessment computing system 601 may also include a number of external or internal devices such as input or output devices. For example, the durability assessment computing system 601 is shown with an input/output ("I/O") interface 608 that can receive input from input devices or provide output to output devices. A bus 606 can also be included in the durability assessment computing system 601. The bus 606 can communicatively couple one or more components of the durability assessment computing system 601.

The durability assessment computing system 601 executes program code that configures the processor 602 to perform one or more of the operations described above with respect to FIGS. 1-5. The program code includes operations related to, for example, one or more of the resource availability scores 120, the resource allocation scores 130, the durability indices 144, the durability assessment model 160, or other suitable applications or memory structures that perform one or more operations described herein. The program code may be resident in the memory device 604 or any suitable computer-readable medium and may be executed by the processor 602 or any other suitable processor. In some embodiments, the program code described above, the resource availability scores 120, the resource allocation scores 130, the durability indices 144, and the durability assessment model 160 are stored in the memory device 604, as depicted in FIG. 6. In additional or alternative embodiments, one or more of the resource availability scores 120, the resource allocation scores 130, the durability indices 144, the durability assessment model 160, and the program code described above are stored in one or more memory devices accessible via a data network, such as a memory device accessible via a cloud service.

The durability assessment computing system 601 depicted in FIG. 6 also includes at least one network interface 610. The network interface 610 includes any device or group of devices suitable for establishing a wired or wireless data connection to one or more data networks 612. Non-limiting examples of the network interface 610 include an Ethernet network adapter, a modem, or the like. One or more of the entity data repository 105, the allocation computing system 180, or the computing device 290 may be connected to the durability assessment computing system 601 via network 612. The durability assessment computing system 601 is able to communicate with one or more of the entity data repository 105, the allocation computing system 180, or the computing device 290 using the network interface 610. Although FIG. 6 depicts the allocation computing system 180 as connected to durability assessment computing system 601 via the networks 612, other embodiments are possible, including the durability assessment computing system 601 determining whether to grant the entity computing device 390 access to a computing resource.

General Considerations

Numerous specific details are set forth herein to provide a thorough understanding of the claimed subject matter. But, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising one or more processing devices performing operations comprising:
    accessing a durability assessment model, the durability assessment model being generated by a process that includes:
        ranking a plurality of entities according to a respective resource availability score of each entity in the plurality of entities, wherein the respective resource availability score of each entity measures an amount of resources associated with the entity;
        ranking the plurality of entities according to a respective resource allocation score of each entity in the plurality of entities, wherein the respective resource allocation score of each entity measures an allocation of available resources associated with the entity;
        calculating a combination score for each entity by combining the ranking of the respective resource availability score of the entity and the ranking of the respective resource allocation score of the entity; and
        determining a set of durability indices by:
            dividing the combination scores for the plurality of entities into ranges, each range being associated with a durability index of the set of durability indices; and
            for each durability index in the set of durability indices, determining a resource availability range for the respective resource availability score and a resource allocation range for the respective resource allocation score;
    obtaining a particular resource availability score and a particular resource allocation score for an additional entity;
    comparing the particular resource availability score and the particular resource allocation score for the additional entity with the resource availability ranges and the resource allocation ranges associated with the set of durability indices;
    determining, based on the durability assessment model, a durability index for the additional entity based on the particular resource availability score and the particular resource allocation score for the additional entity falling into a respective resource availability range and a respective resource allocation range associated with the durability index for the additional entity; and
    transmitting the durability index for the additional entity to an allocation computing system for use in controlling access of the additional entity to one or more interactive computing environments.

2. The method of claim 1, wherein the durability assessment model is configured to output the durability index from the set of durability indices based on an input that includes the combination score for each entity.

3. The method of claim 1, wherein the durability index for the additional entity causes the allocation computing system to grant or deny the additional entity access to the one or more interactive computing environments.

4. The method of claim 1, wherein calculating the combination score for each entity includes determining an average of the ranking of the respective resource availability score and the ranking of the respective resource allocation score.

5. The method of claim 1, wherein the durability assessment model is implemented using one or more of: a decision tree, a binary decision tree, a random forest model.

6. The method of claim 1, wherein the particular resource availability score and the particular resource allocation score for the additional entity are received from an additional computing system.

7. The method of claim 1, wherein the particular resource availability score and the particular resource allocation score are received via a requesting computing system, the requesting computing system associated with the additional entity.

8. A non-transitory computer-readable storage medium having program code that is executable by a processor device to cause a computing device to perform operations, the operations comprising:
    accessing a durability assessment model, the durability assessment model being generated by a process that includes:
        ranking a plurality of entities according to a respective resource availability score of each entity in the plurality of entities, wherein the respective resource availability score of each entity measures an amount of resources associated with the entity;
        ranking the plurality of entities according to a respective resource allocation score of each entity in the plurality of entities, wherein the respective resource allocation score of each entity measures an allocation of available resources associated with the entity;
        calculating a combination score for each entity by combining the ranking of the respective resource availability score of the entity and the ranking of the respective resource allocation score of the entity; and
        determining a set of durability indices by:
            dividing the combination scores for the plurality of entities into ranges, each range being associated with a durability index of the set of durability indices; and
            for each durability index in the set of durability indices, determining a resource availability range for the respective resource availability score and a resource allocation range for the respective resource allocation score;
    obtaining a particular resource availability score and a particular resource allocation score for an additional entity;
    comparing the particular resource availability score and the particular resource allocation score for the additional entity with the resource availability ranges and the resource allocation ranges associated with the set of durability indices;
    determining, based on the durability assessment model, a durability index for the additional entity based on the particular resource availability score and the particular resource allocation score for the additional entity falling into a respective resource availability range and a respective resource allocation range associated with the durability index for the additional entity; and transmitting the durability index for the additional entity to an allocation computing system for use in controlling access of the additional entity to one or more interactive computing environments.

9. The non-transitory computer-readable storage medium of claim 8, wherein the durability assessment model is configured to output a durability index from the set of durability indices based on an input that includes the combination score for each entity.

10. The non-transitory computer-readable storage medium of claim 8, wherein the durability index for the additional entity is configured to cause the allocation computing system to grant or deny the additional entity access to the one or more interactive computing environments.

11. The non-transitory computer-readable storage medium of claim 8, wherein calculating the combination score for each entity includes determining an average of the ranking of the respective resource availability score and the ranking of the respective resource allocation score.

12. The non-transitory computer-readable storage medium of claim 8, wherein the durability assessment model is configured to be implemented using one or more of: a decision tree, a binary decision tree, a random forest model.

13. The non-transitory computer-readable storage medium of claim 8, wherein the particular resource availability score and the particular resource allocation score for the additional entity are configured to be received from an additional computing system.

14. The non-transitory computer-readable storage medium of claim 8, wherein the operations further comprise:
calculating, via a score calculation module, the particular resource availability score and the particular resource allocation score for the additional entity.

15. A system comprising:
a processing device; and
a memory device in which instructions executable by the processing device are stored for configuring the processing device for:
accessing a durability assessment model, the durability assessment model being configured to be generated by a process that includes:
ranking a plurality of entities according to a respective resource availability score of each entity in the plurality of entities, wherein the respective resource availability score of each entity measures an amount of resources associated with the entity;
ranking the plurality of entities according to a respective resource allocation score of each entity in the plurality of entities, wherein the respective resource allocation score of each entity measures an allocation of available resources associated with the entity;
calculating a combination score for each entity by combining the ranking of the respective resource availability score of the entity and the ranking of the respective resource allocation score of the entity; and
determining a set of durability indices by:
dividing the combination scores for the plurality of entities into ranges, each range being associated with a durability index of the set of durability indices; and
for each durability index in the set of durability indices, determining a resource availability range for the respective resource availability score and a resource allocation range for the respective resource allocation score;
obtaining a particular resource availability score and a particular resource allocation score for an additional entity;
comparing the particular resource availability score and the particular resource allocation score for the additional entity with the resource availability ranges and the resource allocation ranges associated with the set of durability indices;
determining, based on the durability assessment model, a durability index for the additional entity based on the particular resource availability score and the particular resource allocation score for the additional entity falling into a respective resource availability range and a respective resource allocation range associated with the durability index for the additional entity; and
transmitting the durability index for the additional entity to an allocation computing system for use in controlling access of the additional entity to one or more interactive computing environments.

16. The system of claim 15, wherein the durability assessment model is configured to output a durability index from the set of durability indices based on an input that includes the combination score for each entity.

17. The system of claim 15, wherein the durability index for the additional entity is configured to cause the allocation computing system to grant or deny the additional entity access to the one or more interactive computing environments.

18. The system of claim 15, wherein calculating the combination score for each entity includes determining an average of the ranking of the respective resource availability score and the ranking of the respective resource allocation score.

19. The system of claim 15, wherein the durability assessment model is configured to be implemented using one or more of: a decision tree, a binary decision tree, a random forest model.

20. The system of claim 15, wherein the particular resource availability score and the particular resource allocation score for the additional entity are configured to be received from an additional computing system.

* * * * *